United States Patent
Cooper (10) Patent No.: US 10,699,030 B2
(45) Date of Patent: Jun. 30, 2020

(54) DETERMINING CRYPTOGRAPHIC OPERATION MASKS FOR IMPROVING RESISTANCE TO EXTERNAL MONITORING ATTACKS

(71) Applicant: CRYPTOGRAPHY RESEARCH, INC., Sunnyvale, CA (US)

(72) Inventor: Jeremy Samuel Cooper, San Francisco, CA (US)

(73) Assignee: CRYPTOGRAPHY RESEARCH INC., San Francisco, CA (US)

(*) Notice: Subject to any disclaimer, the term of this patent is extended or adjusted under 35 U.S.C. 154(b) by 295 days.

(21) Appl. No.: 15/533,845

(22) PCT Filed: Nov. 23, 2015

(86) PCT No.: PCT/US2015/062150
§ 371 (c)(1),
(2) Date: Jun. 7, 2017

(87) PCT Pub. No.: WO2016/109061
PCT Pub. Date: Jul. 7, 2016

(65) Prior Publication Data
US 2018/0167196 A1 Jun. 14, 2018

Related U.S. Application Data

(60) Provisional application No. 62/098,189, filed on Dec. 30, 2014.

(51) Int. Cl.
G06F 21/75 (2013.01)
G06F 21/72 (2013.01)
(Continued)

(52) U.S. Cl.
CPC .......... G06F 21/755 (2017.08); G06F 21/72 (2013.01); H04L 9/003 (2013.01); H04L 9/0625 (2013.01);
(Continued)

(58) Field of Classification Search
CPC .......... G06F 9/30018; G06F 9/30036; G06F 21/556; G06F 21/602; G06F 21/72–725;
(Continued)

(56) References Cited

U.S. PATENT DOCUMENTS 7,668,310 B2 2/2010 Kocher et al.
8,625,794 B2 1/2014 Michiels
(Continued)

FOREIGN PATENT DOCUMENTS

WO WO-2013-139380 A1 9/2013

OTHER PUBLICATIONS

EP Extended European Search Report dated Jul. 11, 2018 re: EP Appln. No. 15875894.6. 8 Pages.
(Continued)

Primary Examiner — Kevin Bechtel
(74) Attorney, Agent, or Firm — Lowenstein Sandler LLP (57) ABSTRACT

Systems and methods for determining cryptographic operation masks for improving resistance to external monitoring attacks. An example method may comprise: selecting a first input mask value, a first output mask value, and one or more intermediate mask values; based on the first output mask value and the intermediate mask values, calculating a first transformation output mask value comprising two or more portions, wherein concatenation of all portions of the first transformation output mask value produces the first transformation output mask value, and wherein exclusive disjunction of all portions of the first transformation output mask value is equal to the first output mask value; and
(Continued)

performing a first masked transformation based on the first transformation output mask value and the first input mask value.

20 Claims, 7 Drawing Sheets

(51) Int. Cl.
*H04L 9/06* (2006.01)
*H04L 9/00* (2006.01)
(52) U.S. Cl.
CPC ........ *H04L 9/0631* (2013.01); *H04L 2209/04* (2013.01)
(58) Field of Classification Search
CPC ...... G06F 21/75–755; G06F 2207/7219–7271; H04L 9/002–005; H04L 9/0618–0637; H04L 2209/04–046
See application file for complete search history.

(56) References Cited

U.S. PATENT DOCUMENTS

| | | |
|---|---|---|
| 2006/0045264 A1 | 3/2006 | Kocher et al. |
| 2006/0184807 A1 | 8/2006 | Kocher et al. |
| 2006/0256963 A1 | 11/2006 | Gebotys |
| 2009/0086976 A1 | 4/2009 | Scian |
| 2012/0159186 A1 | 6/2012 | Farrugia et al. |
| 2014/0281573 A1 | 9/2014 | Jaffe |
| 2016/0127123 A1* | 5/2016 | Johnson ............... H04L 9/003 713/189 |

OTHER PUBLICATIONS

Muir, James A., "A Tutorial on White-Box AES", International Association for Cryptologic Research, vol. 20130228:053134, Feb. 28, 2013, pp. 1-25, XP061007352. 25 Pages.

Prouff et al., "A generic method for secure Sbox implementation", In: Information Security Applications, Aug. 29, 2007 (Aug. 29, 2007); Retrieved from <http://www.matthleurivaln.com/wp-content/uploads/2013/03/wisa07.pdf>, entire document, 23 pages.

PCT Notification of Transmittal of the International Search Report and the Written Opinion of the International Searching Authority for PCT Application No. PCT/US2015/062150, dated Jan. 22, 2016, 17 pages.

Launchbury, John et al., "Efficient Lookup—Table Protocol in Secure Multiparty Computation", 2012 International Conference on Functional Programming, ICFP 2012, Sep. 9-15, 2012. 12 pages.

EP Response Filed Feb. 5, 2019 in Response to the Extended European Search Report dated Jul. 11, 2018 and the Official Communication Pursuant to Rules 70(2) and 70a(2) EPC dated Jul. 27, 2018. 13 Pages.

* cited by examiner

510 Select first input mask value ($M_{i1}$), first output mask value ($M_{o1}$), and intermediate mask values (a, b, c)

515 Calculate intermediate mask value d = a ^ b ^ c ^ $M_{o1}$

520 Calculate a first transformation output mask value ($Q_1$=a||b||c||d)

530 Generate first masked table ($T_{m1}$) using $Q_1$ and $M_{i1}$

540 Generate a second masked table ($T_{m2}$) based on a second input mask value ($M_{i2}$) and a second output mask value ($M_{o2}$), such that $M_{i2}$ = $M_{o1}$ and $M_{o2}$ = $Mi_1$ 550 Use first masked table (and, optionally, second masked table) in a plurality of rounds of a cryptographic operation

DETERMINING CRYPTOGRAPHIC OPERATION MASKS FOR IMPROVING RESISTANCE TO EXTERNAL MONITORING ATTACKS

RELATED APPLICATIONS

This application is the U.S. national stage under 35 U.S.C. § 371 of International Application Number PCT /US2015/ 062150, filed Nov. 23, 2015, which claims the benefit of U.S. Provisional Application No. 62/098,189, filed Dec. 30, 2014. The entire contents of the above-referenced applications are incorporated by reference herein.

TECHNICAL FIELD

The present disclosure is generally related to computer systems, and is more specifically related to cryptographic data processing systems and methods.

BACKGROUND

Systems and methods for safeguarding cryptographic keys and/or other sensitive data are constantly evolving, as are systems and methods for gaining unauthorized access to the protected data. These systems and methods range from brute force password cracking to complex external monitoring attacks.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for determining cryptographic operation masks for improving resistance to external monitoring attacks.

"Cryptographic operation" herein shall refer to a data processing operation involving secret parameters (e.g., an encryption or decryption operation using secret keys). "Cryptographic data processing system" herein shall refer to a data processing system (e.g., a general purpose or specialized processor, a system-on-chip, or the like) configured or employed for performing cryptographic operations.

"External monitoring attack" herein refers to a method of gaining unauthorized access to protected information by deriving one or more protected information items from certain aspects of the physical implementation of the target cryptographic data processing system. Side channel attacks are external monitoring attacks that are based on measuring values of one or more physical parameters associated with a target cryptographic data processing system, such as the elapsed time of certain data processing operations, the power consumption by certain circuits, the current flowing through certain circuits, heat or electromagnetic radiation emitted by certain circuits of the target cryptographic data processing system, etc.

Various side channel attacks may be designed to obtain unauthorized access to certain protected information (e.g., encryption keys that are utilized to transform the input plaintext into a cipher text) being stored within and/or processed by a target cryptographic system. In an illustrative example, an attacker may exploit interactions of sequential data manipulation operations which are based on certain internal states of the target data processing system. The attacker may apply differential power analysis (DPA) methods to measure the power consumption by certain circuits of a target cryptographic data processing system responsive to varying one or more data inputs of sequential data manipulation operations, and thus determine one or more protected data items (e.g., encryption keys) which act as operands of the data manipulation operations.

The present disclosure describes systems and methods for performing cryptographic data processing operations in a manner resistant to external monitoring attacks (e.g., DPA attacks). In various illustrative examples, a DPA attack may target the output of a non-linear data processing operation that may be performed using a certain transformation or a lookup table. The methods described herein involve masking the input and output of certain cryptographic operations (e.g., by performing the exclusive disjunction operation (XOR) of an output mask and the output state to produce the masked output state), as described in more details herein below. As certain encryption/decryption methods may involve multiple rounds of data processing operations, the masked output value produced by an encryption/decryption round may need to be re-masked before performing the next round of encryption or decryption. In certain implementations, the re-masking operation may be performed by applying a second input mask to the masked output value and then removing the first output mask. The present disclosure provides systems and methods for determining an output mask based on a desired value of the next round input mask, and, conversely, determining the next round input mask based on a known value of output mask applied in the current round, such that re-masking operations become unnecessary.

The systems and methods described herein may be implemented by hardware (e.g., general purpose and/or specialized processing devices, and/or other devices and associated circuitry), software (e.g., instructions executable by a processing device), or a combination thereof. Various aspects of the methods and systems are described herein by way of examples, rather than by way of limitation.

In various illustrative examples described herein below, cryptographic data processing systems may be configured or employed for implementing encryption and/or decryption methods based on the Advanced Encryption Standard (AES). However, the systems and methods described herein for determining cryptographic operation masks may be applicable to various other cryptographic data processing systems and methods.

Figure 1:
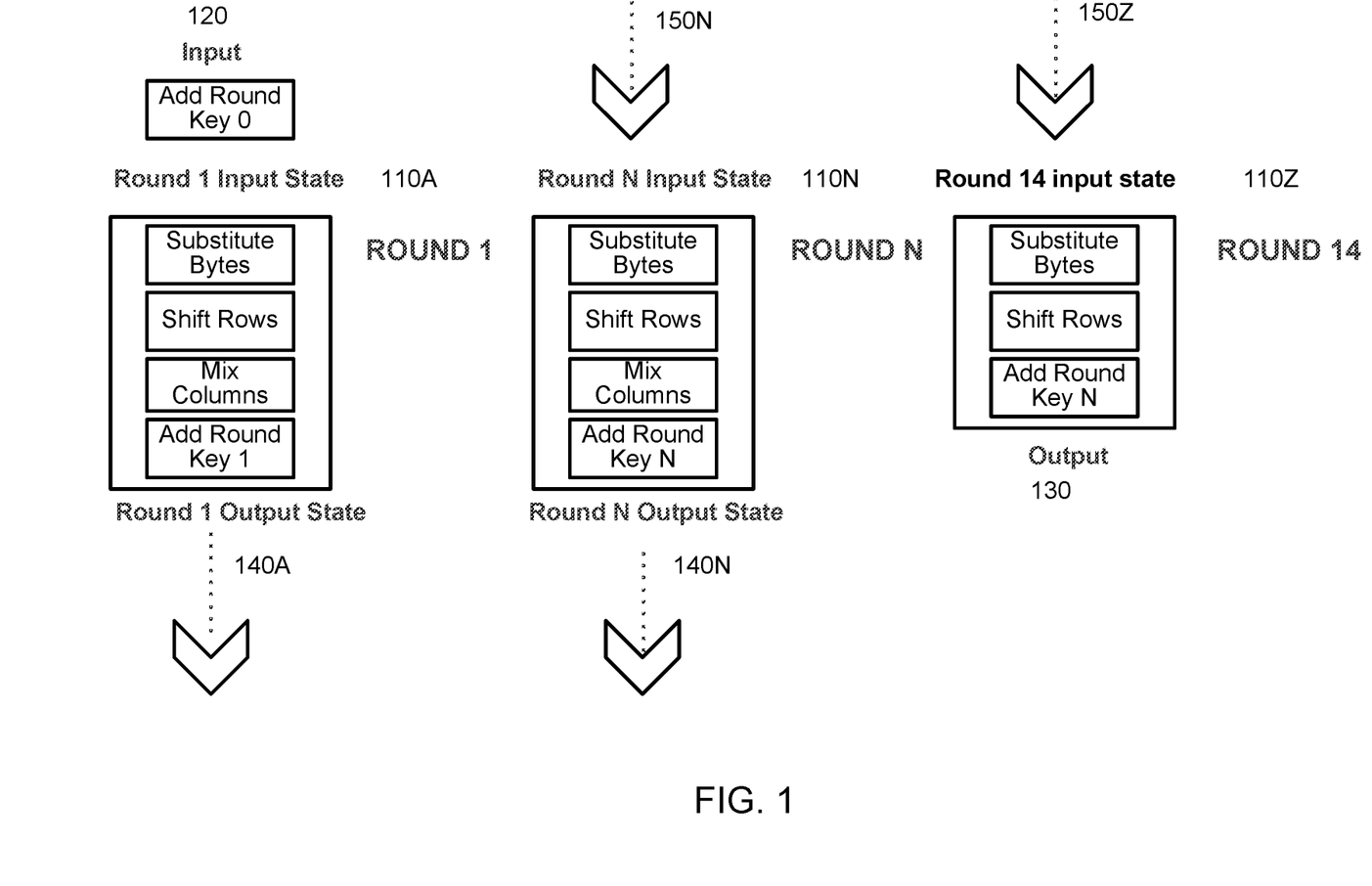
FIG. 1 schematically illustrates a data flow diagram of an example Advanced Encryption Standard (AES) implementation by a general purpose or a specialized data processing device.

FIG. 1 schematically illustrates a data flow diagram of an example AES implementation by a general purpose or a specialized data processing device. The AES algorithm performs several iterations (also referred to as "rounds") 110A-110Z to transform, using an encryption key of a fixed size (128, 192, or 256 bits) and a plaintext 120 of a fixed size (i.e., 128 bits) into an encrypted cipher text 130. Each round comprises a sequence of certain arithmetic, logical, or reordering operations performed on an input state using a round key which is derived from the encryption key. The resulting state 140 of each but the last round is then utilized as the input state 150 of the subsequent round.

An example AES implementation may start by initializing the state with a 128-bit plaintext. The data processing device may then perform the initial AES round by adding, using the exclusive OR (XOR) operation, the first round key to the state in order to determine the Round 1 input state which can subsequently be operated upon by the first AES round 110A.

In an encryption operation, each subsequent AES round 110N comprises four main operations to update the round state: Substitute Bytes (independently operates on each of the 16 bytes of the state), Shift Rows (reorders the 16 bytes of the state), Mix Columns (independently operates on each of four 32-bit words of the state), and Add Round Key (adds, using XOR operation, the round key to the state). The last AES round 110Z comprises three of the above described operations, by omitting the Mix Columns operation. In a decryption operation (not shown in FIG. 1), each AES round comprises inverse operations corresponding to the above described operations, which are performed in the reverse order.

Various AES implementations may differ by the cipher key size: 128 bits, 192 bits, or 256 bits. The number of AES rounds may be defined by the key size: for the key size of 128 bits, ten AES rounds may be performed; for the key size of 192 bits, twelve AES rounds may be performed; and for the key size of 256 bits, fourteen AES rounds may be performed.

In certain implementations, a data processing device may employ lookup tables for performing certain non-linear data processing operations. In an illustrative example a data processing device may employ a table (also referred to as "S-box") for performing the Substitute Bytes operation. In another illustrative example a data processing device may employ a table (also referred to as "T-box") for performing Substitute Bytes, Shift Rows and Mix Columns operations together, as described in more details herein below.

For protection against DPA attacks, a data processing device may mask the round state by performing the exclusive disjunction (XOR) operation of the round state with a certain mask. The methods described herein involve masking the input and output of certain cryptographic operations using an input and output mask, to break the otherwise possible linear association between the observable power consumption by the data processing device and the cryptographic operation state bits. As certain encryption/decryption methods may involve multiple rounds of data processing operations, the masked output value produced by an encryption/decryption round may interfere with the proper operation of the algorithm and may need to be unmasked before performing the next round of encryption or decryption. In certain implementations, the unmasking operation may be performed by applying a further input mask to the masked output value and then removing the output mask.

Figure 2:
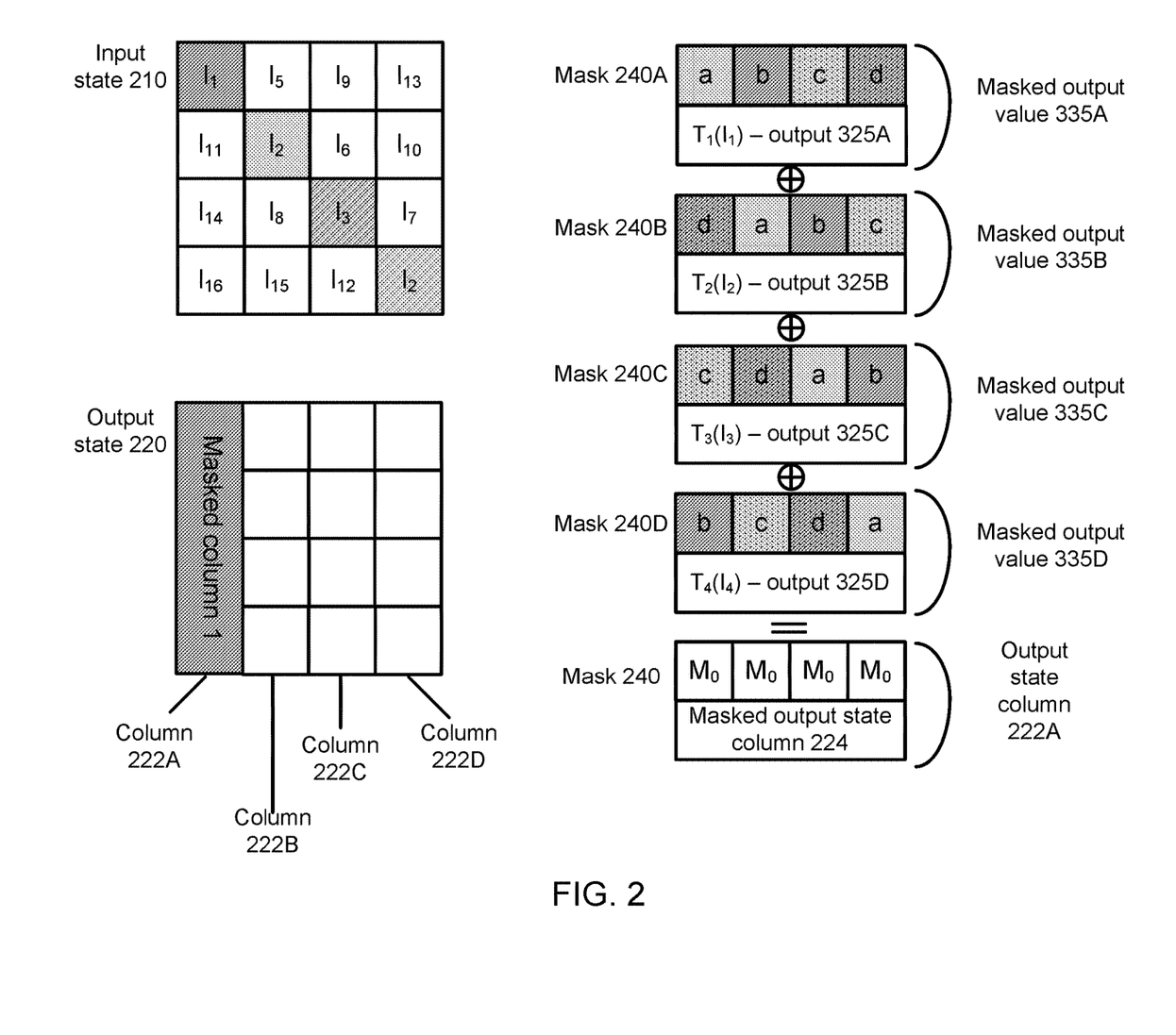
FIG. 2 schematically illustrates an example data processing operation performed by applying a masked lookup table or a masked transformation, in accordance with one or more aspects of the present disclosure.

FIG. 2 schematically illustrates an example data processing operation performed by applying a masked transformation or a masked lookup table (e.g., a masked T-box), in accordance with one or more aspects of the present disclosure. For the purposes of this description and certain AES implementations, the state array may be represented by a 4×4 matrix of bytes, also referred to as a block, such that the same or similar sequence of operations is performed upon each block. Other cipher implementations (such as Rijndael) may use larger block sizes.

For clarity, FIG. 2 only illustrates performing method operations on one 4×4 block. As schematically illustrated by FIG. 2, block 210 may represent an input state and block 220 may represent an output state of an AES round. As noted herein above, both input state block 210 and output state block 220 may be masked using, respectively, an input mask and an output mask, for improving resistance to DPA attacks.

Each AES round can be said to comprise four sub-rounds, such that operations are performed within each sub-round upon four state elements (bytes) $I_j$ selected in accordance with a certain sequence of elements of the round input state. The resulting four bytes are outputted into certain positions of the round output state.

A processing device implementing the cryptographic operation may, at each sub-round, select four state elements (bytes) of input state block 210, according to a pre-defined sequence of elements, which is indicated in FIG. 2 by element indices 1-16, such that elements $I_1$-$I_4$ are selected in the first sub-round, elements $I_5$-$I_8$ are selected in the second sub-round, etc.

Performing j-th sub-round comprises processing each of the four 8-bit elements $I_{(j-1)*4+1} \ldots I_{(j-1)*4+4}$ using a masked transformation or a masked lookup table that yields a 32-bit output. The masked transformation or a previously constructed masked lookup table yields an output value that is masked using an output mask, as schematically illustrated by FIG. 3A.

Figure 3A:
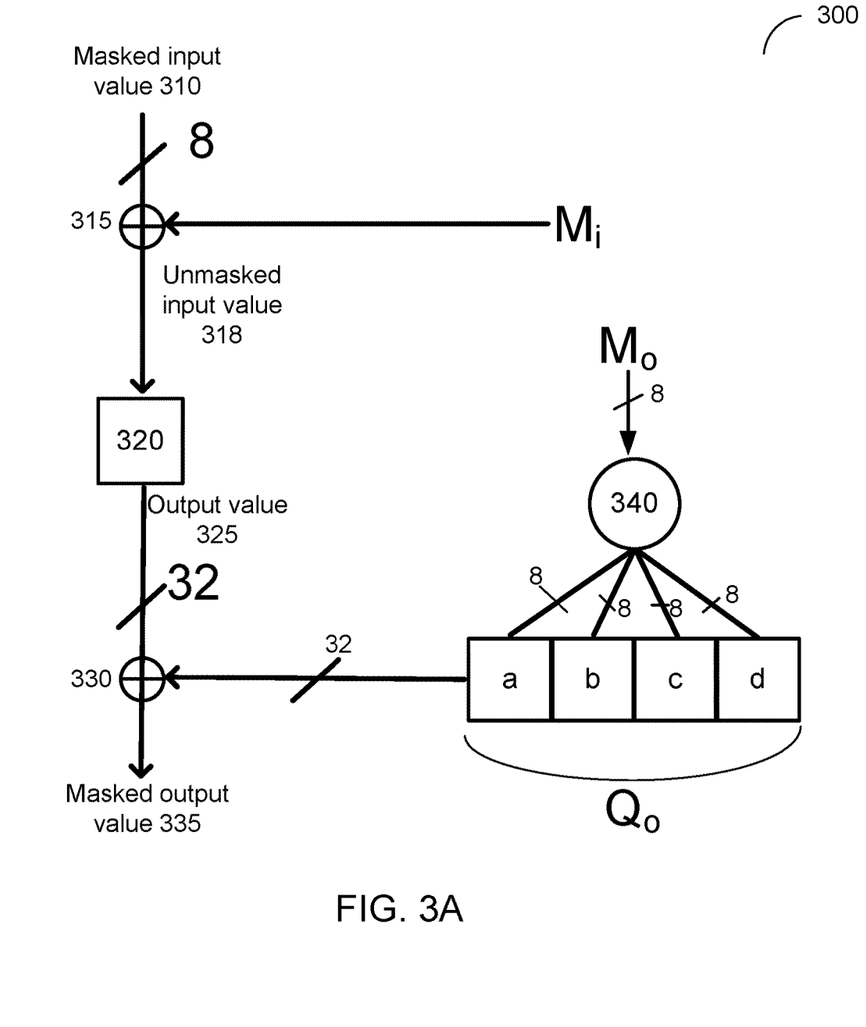
FIG. 3A schematically illustrates a functional block for performing a masked transformation, or for generating a masked look-up table that performs the masked transformation (e.g., a masked T-box in AES), in accordance with one or more aspects of the present disclosure.

FIG. 3A schematically illustrates a functional block for performing a masked transformation, or for generating a masked look-up table that performs the masked transformation (e.g., a masked T-box in AES), in accordance with one or more aspects of the present disclosure. A masked lookup table generated by functional block 300 may be employed for performing an AES round, and may be implemented by hardware (e.g., general purpose and/or specialized processing devices, and/or other devices and associated circuitry), software (e.g., instructions executable by a processing device), or a combination thereof.

An 8-bit table input value 310 is unmasked by performing exclusive disjunction operation (XOR) 315 using input mask $M_i$. The resulting unmasked input value 318 is then fed to box 320. For AES implementations, box 320 represents an 8 bit×32 bit T-box or an equivalent transformation according to the AES standard. In other cipher implementations (e.g., DES, Blowfish, Twofish, etc.) box 320 may be the particular lookup table or transformation used for that particular cipher. Box 320 produces a 32-bit output value 325 which is then XOR'd 330 with output mask value $Q_o$, to produce masked output value 335. To create a masked lookup table, the process implemented by functional block 300 may be repeated for every possible value (e.g., 0-255) of the 8-bit masked input value 310, to generate 256 different 32-bit outputs that may be stored in the masked lookup table, where each 32-bit output of the masked lookup table is indexed by its corresponding masked input value 310.

Figure 3B:
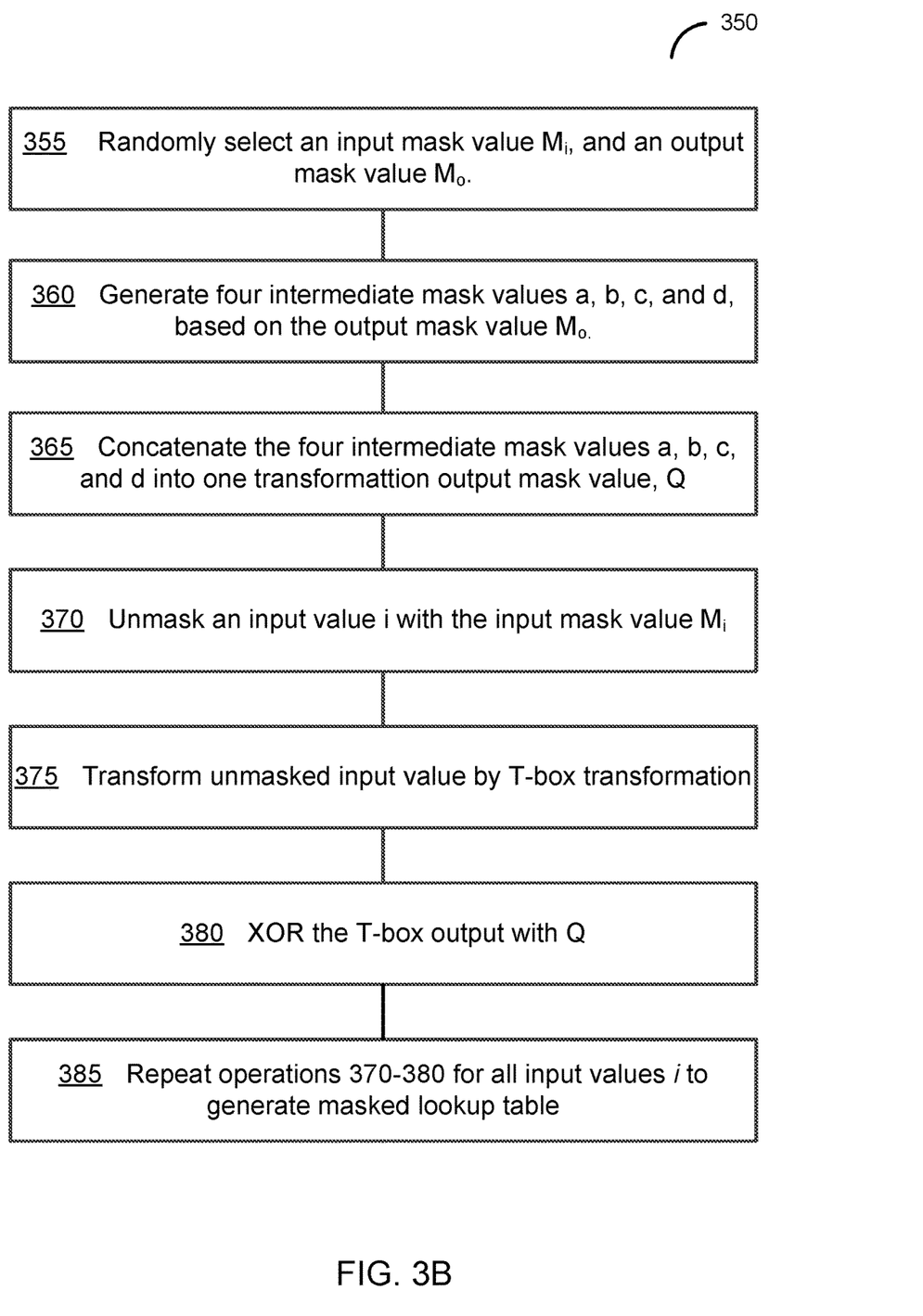
FIG. 3B depicts a flow diagram of an example method for generating look-up table for computing a masked transformation of an input value for the AES cipher, in accordance with one or more aspects of the present disclosure.

FIG. 3B depicts a flow diagram of an example method 350 for generating look-up table for computing a masked transformation of an input value for the AES cipher, in accordance with one or more aspects of the present disclosure. In an illustrative example, method 350 may be implemented by functional block 300 of FIG. 3A. Method 350 and/or each of its individual functions, routines, subroutines, or operations may be performed by one or more general purpose and/or specialized processing devices. Two or more functions, routines, subroutines, or operations of method 350 may be performed in parallel or in an order that may differ from the order described above. In certain implementations, method 350 may be performed by a single processing thread. Alternatively, method 350 may be performed by two or more processing threads, each thread executing one or more individual functions, routines, subroutines, or operations of the method. In an illustrative example, the processing threads implementing method 350 may be synchronized (e.g., using semaphores, critical sections, and/or other thread synchronization mechanisms). Alternatively, the processing threads implementing method 350 may be executed asynchronously with respect to each other. In an illustrative example, method 350 may be performed by computing system 1000 described herein below with references to FIG. 6.

At block 355, two 8-bit mask quantities may be selected randomly: an input mask value $M_i$, and an output mask value $M_o$.

At block 360, the output mask value $M_o$ is used as the basis for generating four 8-bit intermediate mask values: a, b, c, and d. There are various ways of determining the values for these four intermediate mask values. In certain implementations, three of the intermediate mask values—a, b, and c—may be randomly generated. The last intermediate mask value, d, may be computed as the exclusive disjunction of the other three intermediate mask values and the output mask value $M_o$, as described by the following equation:

$$d = a \text{ XOR } b \text{ XOR } c \text{ XOR } M_o \quad (1)$$

Alternatively, all four intermediate mask values a, b, c, and d may be determined randomly. $M_o$ may then be computed using the following equation:

$$M_o = a \text{ XOR } b \text{ XOR } c \text{ XOR } d \quad (2)$$

At block 365, the four 8-bit intermediate mask values a, b, c, and d may be concatenated into one 32-bit transformation output mask value, Q. The transformation output mask value may be computed using the following equation, where "||" represents concatenation:

$$Q = a \| b \| c \| d \quad (3)$$

At block 370, a masked input value 310 (also referred to as "i") is unmasked with the input mask value $M_i$.

At block 375, the unmasked input value 318 is transformed by a T-box transformation such as those used in AES operations. The output from a standard T-box transformation is a 32-bit output value (also referred to as "T-box output").

At block 380, 32-bit transformation output mask value Q is XOR'd with the 32-bit output value from the standard T-box transformation used in AES operations. The result is the 32-bit masked transformation 335.

At block 385, operations described with reference to blocks 370 through 380 are repeated for all potential values of the input value i to generate a masked lookup table.

When the masked transformation 335 is used in place of the normal AES T-box in the AES T-box scheme, the round output state will be equal to the unmasked round state combined with the 8-bit output mask value $M_o$, such that no further state manipulation is necessary to proceed with the next round of AES.

The method of FIG. 3B can be represented by the following equation:

$$T_m(i) = T(i \text{ XOR } M_i) \text{ XOR } Q \quad (4)$$

In certain implementations, the same T-box may be used for all AES sub-rounds. Alternatively, three dependent T-boxes may be generated using a given T-box, and the corresponding three masked T-boxes may be generated by functional block 300 using method 350.

Referring again to FIG. 2, applying the T-box transformation to elements $I_1$-$I_4$, and then XOR'ing the output with transformation output mask 240A ("$Q_1$"), produces respective masked output values 335A-335D. The resulting 32-bit value is written into the output state block 220 as its first column 222A. Similarly, the second sub-round comprises applying the T-box transformation to elements $I_5$-$I_8$ to produce the output values that are sequentially XOR'ed together and the resulting 32-bit value is written into the output state block 220 as its second column 222B; the third sub-round comprises applying the T-box transformation to elements $I_9$-$I_{12}$ to produce the output values that are sequentially XOR'ed together and the resulting 32-bit value is written into the output state block 220 as its third column 222C; and the fourth sub-round comprises applying the T-box transformation to elements $I_{13}$-$I_{16}$ to produce the output values that are sequentially XOR'ed together and the resulting 32-bit value is written into the output state block 220 as its fourth column 222D.

In certain AES implementations, the transformations $T_1$-$T_4$ that are utilized for performing Substitute Bytes, Shift Rows, and Mix Columns operations are related to each other such that the transformation $T_{k+1}$ employed for processing the state elements in row k+1 is identical to transformation $T_k$ employed for processing the preceding state elements in row k except that its output for a given input is rotated (right by 8 bits) with respect to transformation $T_k$. Alternatively, transformation $T_1$ may be utilized for all block elements, and the output value produced by the transformation may be rotated right by 8*(k−1) bits for each subsequent row.

Since the masking operation in this disclosure is linear, the output masks are also related to each other in the above described manner, i.e., each output mask value $M_{o(k+1)}$ employed for masking the transformation output value produced by processing state element $I_{k+1}$ is a rotated (right by 8 bits) version of the output mask value $M_{ok}$ employed for masking the lookup table output value produced by processing the preceding state element $I_k$. FIG. 2 schematically illustrates masked output values 335A-335D as produced by applying a respective output mask 240A-240D to a corresponding unmasked output value 325A-325D.

As schematically illustrated by FIG. 2, transformation output mask 240A ("$Q_1$") comprises the concatenation of the four bytes a, b, c, d; transformation output mask 240B ("$Q_2$") comprises the same four bytes cyclically rotated to the right by one byte: d, a, b, c; transformation output mask 240C ("$Q_3$") comprises the same four bytes cyclically rotated, with respect to transformation output mask 240B, to the right by one byte: c, d, a, b; and transformation output mask 240D ("$Q_4$") comprises the same four bytes cyclically rotated, with respect to transformation output mask 240C, to the right by one byte: b, c, d, a.

As noted herein above, masked output values 335A-335D produced by applying the T-box transformation to elements of the input state block 210 are sequentially added together using the exclusive disjunction (XOR) operation to construct a column of the output state block 222. As the masking operation (exclusive disjunction) is linear, summing (by performing the exclusive disjunction operation (XOR)) the masking output values may be represented by summing unmasked output values 325A-325D to produce an unmasked output state column 224, summing the mask values 240A-240D to produce a mask 240, and then applying mask 240 to the unmasked output state column 224, as described by the following equation:

$$(T_1(I_1)\ XOR\ Q_1)\ XOR\ (T_2(I_2)\ XOR\ Q_2)\ XOR\ (T_3(I_3)\ XOR\ Q_3)\ XOR\ (T_4(I_4)\ XOR\ Q_4) = (T_1(I_1)\ XOR\ (T_2(I_2)\ XOR\ (T_2(I_3)\ XOR\ (T_4(I_4))\ XOR\ (Q_2 XOR\ Q_2 XOR\ Q_3 XOR\ Q_4),$$

wherein $T_i(I_i)$ is the i-th transformation output value of the i-th state element, and $Q_i$ is the transformation output mask applied to mask the output of the i-th lookup table.

As noted herein above, the transformation output masks values are related to each other such that each transformation output mask value $Q_{k+1o(k+1)}$ employed for masking the transformation output value produced by processing state element $I_{i+1}$ is a rotated (right by 8 bits) version of the transformation output mask value $Q_k$ employed for masking the transformation output value produced by processing the preceding state element $I_i$. Hence, the sum 240 of the four mask values may be represented as follows:

$$S = Q_1\ XOR\ Q_2\ XOR\ Q_3\ XOR\ Q_4 = [a;b;c;d]\ XOR\ [d;a;b;c]\ XOR\ [c;d;a;b]\ XOR\ [b;c;d;a],$$

wherein a, b, c, d represent four bytes comprised by each of the transformation output masks.

As the exclusive disjunction operation is commutative, the sum 240 of the four mask values 240A-240D that mask the output state column 224 comprises four bytes, each of them is equal to the value of the exclusive disjunction of the bytes a, b, c, and d:

$$S = [a\ XOR\ d\ XOR\ c\ XOR\ b;\ b\ XOR\ a\ XOR\ d\ XOR\ c;\ c\ XOR\ b\ XOR\ a\ XOR\ d;\ d\ XOR\ c\ XOR\ b\ XOR\ a] = [M_O;\ M_O;\ M_O;\ M_O],$$

wherein $M_O$ is the result of applying the exclusive disjunction operation to bytes a, b, c, d.

Thus, the transformation output mask may be represented by a four-byte value [a; b; c; d], wherein the sum of the four bytes calculated using the exclusive disjunction operation a XOR b XOR c XOR d is equal to a pre-defined value $M_O$. In accordance with one or more aspects of the present disclosure, the output mask value may be defined based on a desired value of the next round input mask: as the output state of the current round will be again processed by the transformation in the subsequent round, the output mask may be defined as comprising four bytes such that the sum of the four bytes, calculated using the exclusive disjunction operation, is equal to the input mask to be applied at the subsequent round of the cryptographic operation: a XOR b XOR c XOR d=$M_i$, as schematically illustrated by FIG. 3.

The pre-defined value $M_O$ may be chosen to be equal to the input mask to be applied at the subsequent round of the cryptographic operation, thus the transformation output mask value may be defined by choosing three transformation output mask portions (bytes a, b, and c) as random values, and determining the remaining transformation output mask portion as exclusive disjunction of the chosen transformation output mask portions and the input mask value $M_i$:

$$d = a\ XOR\ b\ XOR\ c\ XOR\ M_i.$$

Conversely, the next round input mask value may be determined based on a known value of transformation output mask applied in the current round. In an illustrative example, the transformation output mask value may be chosen as a random value, and the next round input mask value may be determined as exclusive disjunction of four bytes comprised by the transformation output mask:

$$M_i = a\ XOR\ b\ XOR\ c\ XOR\ d.$$

In certain implementations, the same masked transformation may be employed to perform several successive rounds of an AES encryption or decryption operation, as each output value is successively masked with a specific byte of the four successive transformation output masks $Q_1=[a;b;c;d]$, $Q_2=[d;a;b;c]$ $Q_3=[c;d;a;b]$ $Q_4=[b;c;d;a]$, and may be unmasked with the single value $M_i$=a XOR b XOR c XOR d.

Alternatively, each AES round may be performed using a different masked transformation, so that the value of the input mask for the next round k+1 is determined based on the value of the output mask $M_{ok}$ employed in the current round k:

$$M_{ik+1} = a_k\ XOR\ b_k\ XOR\ c_k\ XOR\ d_k.$$

Figure 4:
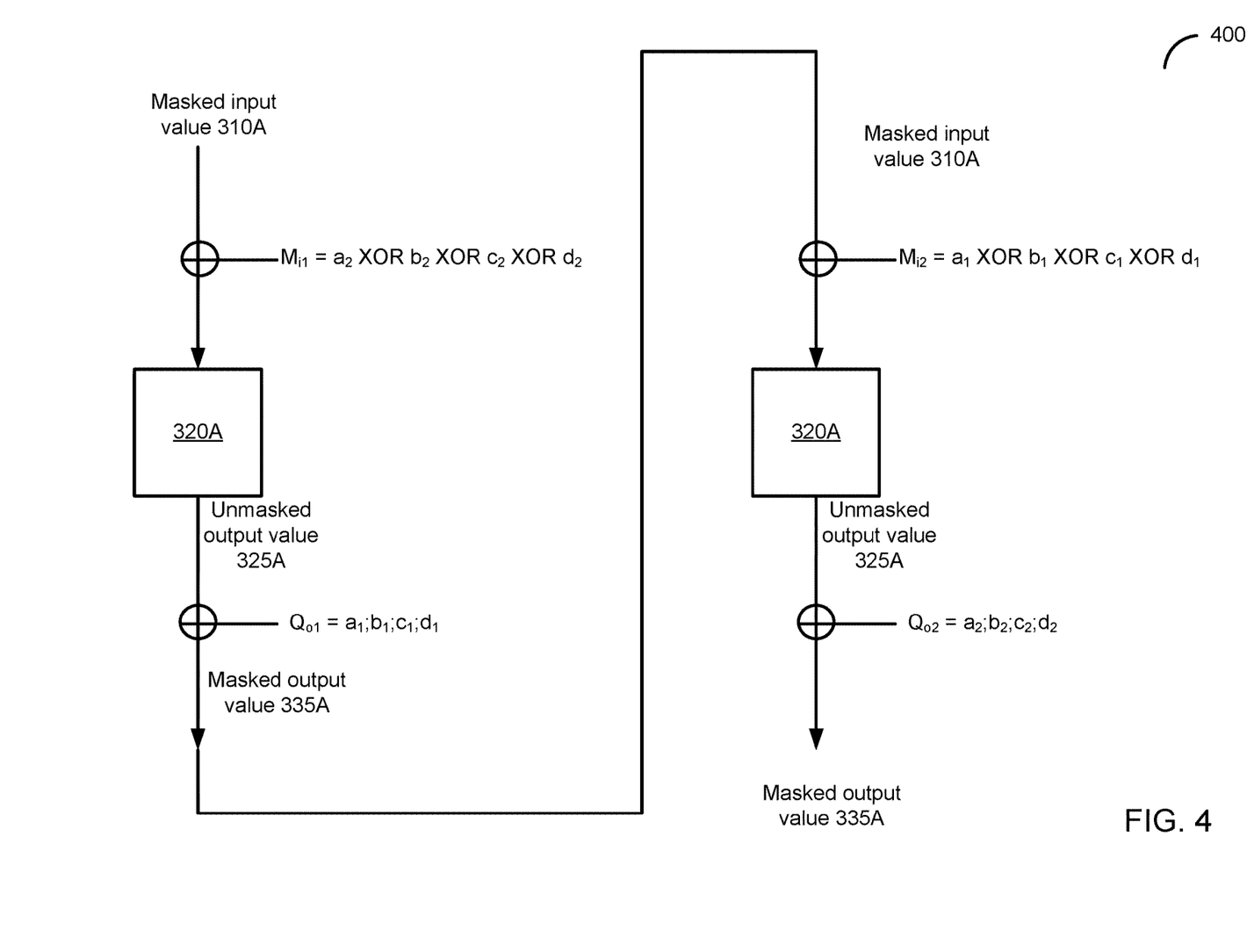
FIG. 4 schematically illustrates a functional block comprising two masked transformations for performing odd and even rounds of a cryptographic operation, in accordance with one or more aspects of the present disclosure.

Alternatively, a first masked transformation may be employed for performing odd rounds of a cryptographic operation, and a second masked transformation may be performed for performing even rounds of the cryptographic operation. FIG. 4 schematically illustrates a functional block 400 comprising two masked transformations 320A-320B for performing odd and even rounds of a cryptographic operation, in accordance with one or more aspects of the present disclosure.

As schematically illustrated by FIG. 4, the value of the input mask $M_{i2}$ to be applied in an even round to unmask the input value 310B may be determined based on the value of the output mask $M_{o1}$ employed in the preceding odd round to mask output 325A of first transformation 320A:

$$M_{i2} = a_1\ XOR\ b_1\ XOR\ c_1\ XOR\ d_1,$$

wherein $M_{i2}$ is the input mask to be applied in an even round, and $a_1$, $b_1$, $c_1$, $d_1$ are the four bytes comprised by the transformation output mask $Q_{o1}$ employed in the preceding odd round. Conversely, the value of the input mask $M_{i1}$ to be applied in an odd round to unmask the input value 310A may be determined based on the value of the transformation output mask $Q_{o2}$ employed in the preceding even round to mask output 325B of second transformation 320B:

$$M_{i1} = a_2\ XOR\ b_2\ XOR\ c_2\ XOR\ d_2,$$

wherein $M_{i1}$ is the input mask to be applied in an odd round, and $a_2$, $b_2$, $c_2$, $d_2$ are the four bytes comprised by the transformation output mask $Q_{o2}$ employed in the preceding even round.

In certain implementations, masking transformation values in accordance with one or more aspects of the present disclosure may be performed in one or more (e.g., two or three) initial rounds of a cryptographic operations, and the remaining rounds may be performed by applying transformations without masking the output values. As one or more rounds are performed without masking the output values, the computational complexity of the overall process may be reduced, while employing the output value masking in one or more rounds may provide a level of security which may be considered satisfactory for certain uses.

Figure 5:
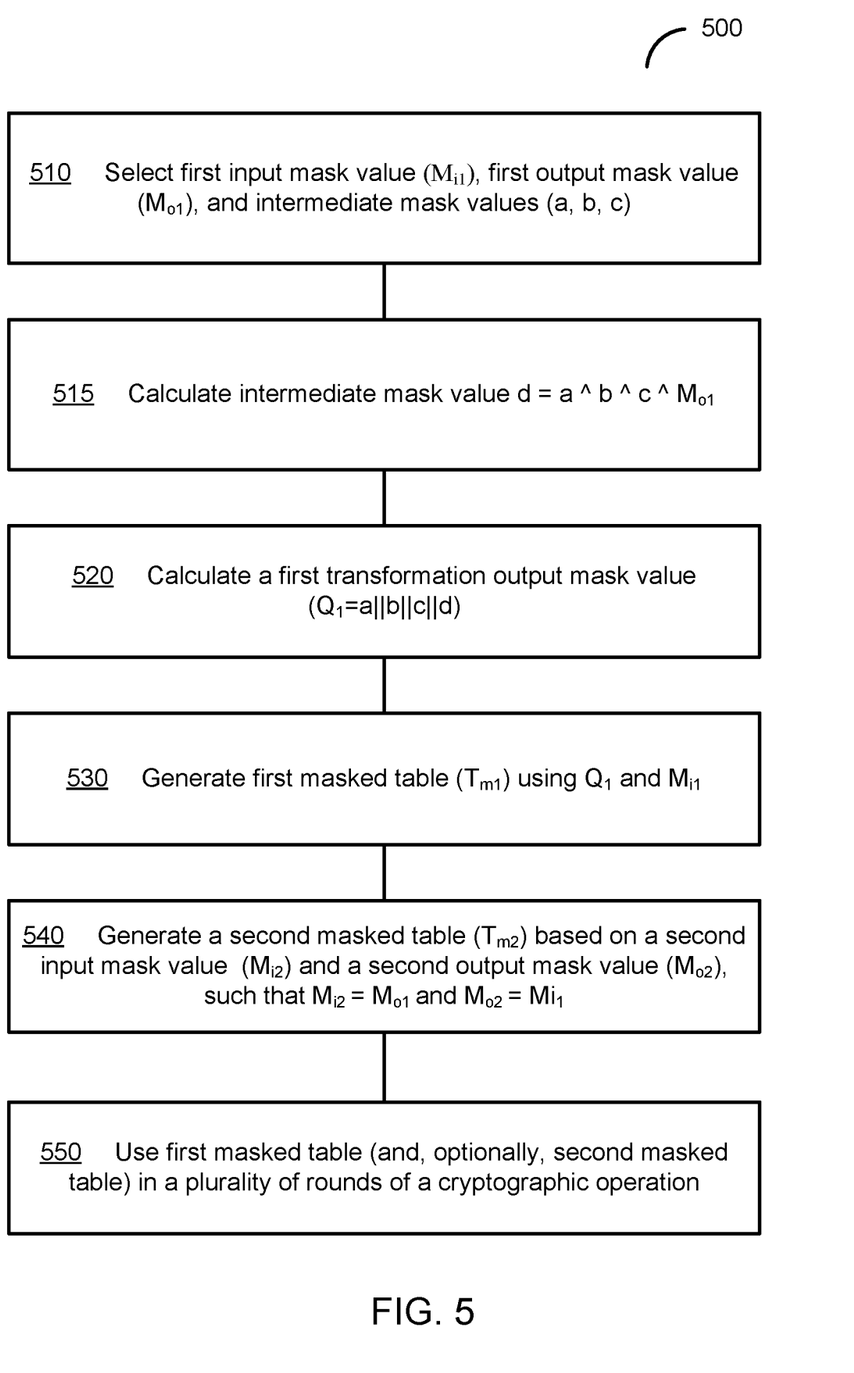
FIG. 5 depicts a flow diagram of an example method for determining a cryptographic operation masks for improving resistance to external monitoring attacks, in accordance with one or more aspects of the present disclosure.

FIG. 5 depicts a flow diagram of an example method 500 for determining cryptographic operation masks for improving resistance to external monitoring attacks, in accordance with one or more aspects of the present disclosure. Method 500 and/or each of its individual functions, routines, subroutines, or operations may be performed by one or more general purpose and/or specialized processing devices. Two or more functions, routines, subroutines, or operations of method 500 may be performed in parallel or in an order that may differ from the order described above. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. In an illustrative example, method 500 may be performed by computing system 1000 described herein below with references to FIG. 6.

Referring to FIG. 5, at block 510, a processing device implementing the method may select a first input mask value ($M_i$), a first output mask value ($M_o$), and one or more first intermediate mask values (a, b, c), as described in more details herein above. In certain implementations, the processing device may randomly generate the first input mask value, the first output mask value, and one or more first intermediate mask values.

At block 515, the processing device may calculate an additional intermediate mask value (d) as being equal to the exclusive disjunction of the intermediate mask values (a, b, c) and the first output mask value (d=a XOR b XOR c XOR $M_{o1}$).

At block 520, the processing device may, based on the first output mask value ($M_{i1}$) and intermediate mask values (a b, c), calculate a first transformation output mask value ($Q_1$) comprising two or more portions, wherein concatenation of all portions produces the first transformation output mask value ($Q_1$=a||b||c||d), and wherein exclusive disjunction of all portions of the first transformation output mask value is equal to the first output mask value ($M_{o1}$=a XOR b XOR c XOR d), as described in more details herein above.

At block 530, the processing device may generate a first masked table ($T_{m1}$) using the first transformation output mask value ($Q_1$) and the first input mask value ($M_{i1}$), as described in more details herein above. In an illustrative example, the first masked table may comprise 256 one-byte inputs corresponding to 256 four-byte outputs.

The first masked table (also referred to as "masked T-box") may be derived from a fixed transformation (T-box), such that the output of the first masked table (masked T-box) corresponding to an input value (represented by the plaintext on the first round or the output of a previous round for subsequent rounds) is equal to exclusive disjunction of the first substitution output mask value (Q) and the output of the fixed transformation (T-box) corresponding to the input equal to the exclusive disjunction of the input value and the first input mask value ($M_i$).

At block 540, the processing device may optionally generate a second masked table ($T_{m2}$) based on a second input mask value ($M_{i2}$) and a second output mask value ($Q_2$), such that the second input mask value is equal to the first output mask value ($M_{i2}=M_{o1}$) and the second output mask value is equal to the first input mask value ($M_{o2}=M_{o1}$), as described in more details herein above with reference to FIG. 4.

At block 550, the processing device may use the first masked table (and, optionally, the second masked table) in a plurality of rounds of a cryptographic operation, as described in more details herein above. In various illustrative examples, the cryptographic operation may be represented by AES, DES, Blowfish, or Twofish.

Figure 6:
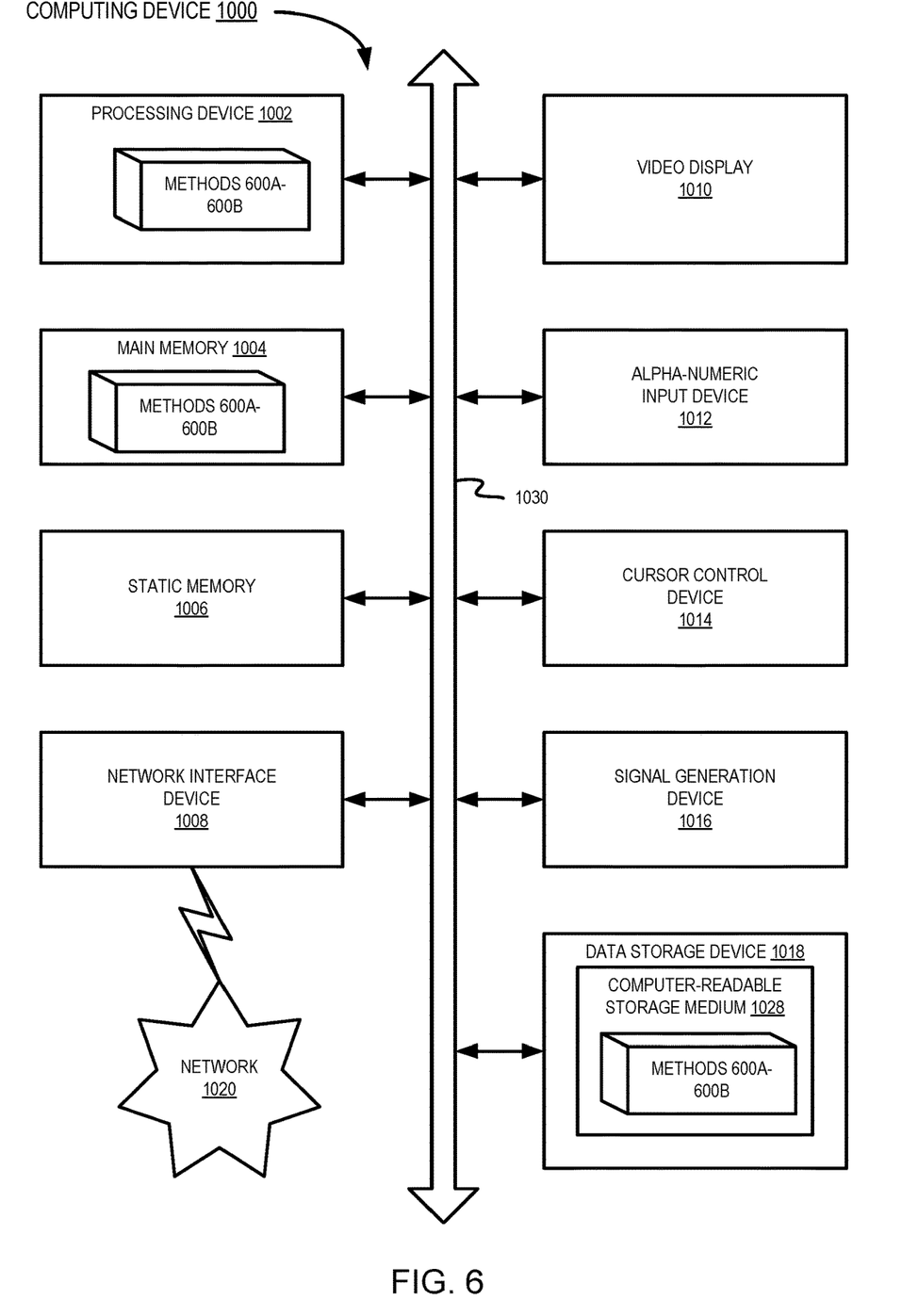
FIG. 6 illustrates a diagrammatic representation of an example computing system within which a set of instructions, for causing the computing device to perform the methods described herein, may be executed.

FIG. 6 illustrates a diagrammatic representation of a computing system 1000 which may incorporate the processing device described herein and within which a set of instructions, for causing the computing device to perform the methods described herein, may be executed. Computing system 1000 may be connected to other computing devices in a LAN, an intranet, an extranet, and/or the Internet. The computing device may operate in the capacity of a server machine in a client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods described herein.

The example computing system 1000 may include a processing device 1002, which in various illustrative examples may be a general purpose or specialized processor comprising one or more processing cores. The example computing system 1000 may further comprise a main memory 1004 (e.g., synchronous dynamic random access memory (DRAM), read-only memory (ROM)), a static memory 1006 (e.g., flash memory and a data storage device 1018), which may communicate with each other via a bus 1030.

The processing device 1002 may be configured to execute method 500 for determining cryptographic operation masks for improving resistance to external monitoring attacks, in accordance with one or more aspects of the present disclosure for performing the operations described herein.

The example computing system 1000 may further include a network interface device 1008 which may communicate with a network 1020. The example computing system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, the video display unit 1010, the alphanumeric input device 1012, and the cursor control device 1014 may be combined into a single component or device (e.g., an LCD touch screen).

The data storage device 1018 may include a computer-readable storage medium 1028 on which may be stored one or more sets of instructions (e.g., instructions of method 500 for determining cryptographic operation masks for improving resistance to external monitoring attacks, in accordance with one or more aspects of the present disclosure) implementing any one or more of the methods or functions described herein. Instructions implementing method 500 may also reside, completely or at least partially, within the main memory 1004 and/or within the processing device 1002 during execution thereof by the example computing system 1000, hence the main memory 1004 and the processing device 1002 may also constitute or comprise computer-readable media. The instructions may further be transmitted or received over the network 1020 via the network interface device 1008.

While the computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method operations. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method of executing a cryptographic operation, comprising:
   selecting a first input mask value, a first output mask value, and one or more intermediate mask values;
   calculating an additional intermediate mask value by applying an exclusive disjunction operation to the one or more intermediate mask values and the first output mask value;
   calculating a transformation output mask value by concatenating the one or more intermediate mask values and the additional intermediate mask value, wherein exclusive disjunction of all portions of the transformation output mask value is equal to the first output mask value;
   generating a first masked transformation table using the transformation output mask value and the first input mask value; and
   protecting the cryptographic operation from an external monitoring attack by performing one or more rounds of the cryptographic operation using the first masked transformation table.

2. The method of claim 1, wherein the selecting comprises randomly generating the first input mask value, the first output mask value, and the intermediate mask values.

3. The method of claim 1, wherein the first masked transformation table is derived from a fixed transformation.

4. The method of claim 3, wherein the output of the first masked transformation table corresponding to an input value is equal to exclusive disjunction of the transformation output mask value and the output of the fixed transformation, the output of the fixed transformation corresponding to an input equal to the exclusive disjunction of the input value and the first input mask value.

5. The method of claim 1, further comprising:
   creating a second masked transformation table based on a second input mask value and a second output mask value, wherein the second input mask value is equal to the first output mask value and the second output mask value is equal to the first input mask value; and
   performing at least one round of the cryptographic operation using the second masked transformation table.

6. The method of claim 1, wherein the first masked transformation table implements a substitution box.

7. The method of claim 6, wherein the cryptographic operation is one of: Advanced Encryption Standard (AES), Data Encryption Standard (DES), Blowfish, or Twofish.

8. A system, comprising:
   a memory to store a first table; and
   a processing device coupled to the memory, the processing device to:
   select a first input mask value, a first output mask value, and one or more intermediate mask values;
   calculate an additional intermediate mask value by applying an exclusive disjunction operation to the one or more intermediate mask values and the first output mask value;
   calculate a first transformation output mask value by concatenating the one or more intermediate mask values and the additional intermediate mask value, wherein exclusive disjunction of all portions of the first transformation output mask value is equal to the first output mask value; and
   generate a first masked transformation table using the first transformation output mask value and the first input mask value; and
   protect a cryptographic operation from an external monitoring attack by performing one or more rounds of the cryptographic operation using the first masked transformation table.

9. The system of claim 8, wherein the processing device is configured to randomly generate the first input mask value, the first output mask value, and the intermediate mask values.

10. The system of claim 8, wherein the processing device is configured to derive the first masked transformation table from a fixed transformation.

11. The system of claim 10, wherein the output of the first masked transformation table corresponding to an input value is equal to exclusive disjunction of a first substitution output mask value and an output of the fixed transformation, the output of the fixed transformation corresponding to an input equal to exclusive disjunction of the input value and the first input mask value.

12. The system of claim 8, wherein the processing device is further configured to:
   create a second masked transformation table based on a second input mask value and a second output mask value, wherein the second input mask value is equal to the first output mask value and the second output mask value is equal to the first input mask value; and
   perform at least one round of the cryptographic operation using the second masked transformation table.

13. The system of claim 8, wherein the first masked transformation table implements a substitution box.

14. The system of claim 8, wherein the cryptographic operation is one of: Advanced Encryption Standard (AES), Data Encryption Standard (DES), Blowfish, or Twofish.

15. A computer-readable non-transitory storage medium comprising executable instructions that, when executed by a computing device, cause the computing device to perform operations, comprising:
   selecting a first input mask value, a first output mask value, and one or more intermediate mask values;
   calculating an additional intermediate mask value by applying an exclusive disjunction operation to the one or more intermediate mask values and the first output mask value;
   calculating a first transformation output mask value by concatenating the one or more intermediate mask values and the additional intermediate mask value, wherein exclusive disjunction of all portions of the first transformation output mask value is equal to the first output mask value;
   generating a first masked transformation table using the first transformation output mask value and the first input mask value; and
   protecting a cryptographic operation from an external monitoring attack by performing one or more rounds of the cryptographic operation using the first masked transformation table.

16. The computer-readable non-transitory storage medium of claim 15, wherein the selecting comprises randomly generating the first input mask value, the first output mask value, and the intermediate mask values.

17. The computer-readable non-transitory storage medium of claim 15, wherein the first masked transformation table is derived from a fixed transformation.

18. The computer-readable non-transitory storage medium of claim 15, further comprising executable instructions causing the computing device to:
   create a second masked transformation table based on a second input mask value and a second output mask value, wherein the second input mask value is equal to the first output mask value and the second output mask value is equal to the first input mask value; and
   perform at least one round of the cryptographic operation using the second masked transformation table.

19. The computer-readable non-transitory storage medium of claim 15, wherein the first masked transformation table implements a substitution box.

20. The computer-readable non-transitory storage medium of claim 15, wherein the cryptographic operation is one of: Advanced Encryption Standard (AES), Data Encryption Standard (DES), Blowfish, or Twofish.

* * * * *